United States Patent [19]

Durbin et al.

[11] Patent Number: 5,184,592
[45] Date of Patent: Feb. 9, 1993

[54] METHOD AND APPARATUS FOR FORCE OR TORQUE CONTROL OF A COMBUSTION ENGINE

[76] Inventors: Enoch J. Durbin, 246 Western Way; Paul D. Ronney, 58 Stanworth La., both of Princeton, N.J. 08540

[21] Appl. No.: 646,396

[22] Filed: Jan. 28, 1991

[51] Int. Cl.⁵ ............................................. F02M 31/00
[52] U.S. Cl. ...................................... 123/543; 123/549
[58] Field of Search ............... 123/557, 549, 543, 545, 123/547, 546, 556, 90.15, 90.16, 348

[56] References Cited

U.S. PATENT DOCUMENTS

| | | |
|---|---|---|
| 1,953,809 | 4/1934 | Kenneweg . |
| 3,053,242 | 9/1962 | Arpaia . |
| 3,441,011 | 4/1969 | Karl . |
| 3,672,342 | 6/1972 | Ojala . |
| 4,029,065 | 6/1977 | Wood . |
| 4,044,742 | 8/1977 | Linder . |
| 4,094,275 | 6/1978 | Auiler et al. .......................... 123/557 |
| 4,099,499 | 7/1978 | Giardini et al. ...................... 123/557 |
| 4,362,142 | 12/1982 | Igashira et al. . |
| 4,401,091 | 8/1983 | Costello et al. ...................... 123/557 |
| 4,434,773 | 3/1984 | Granetzke ............................ 123/557 |
| 4,527,553 | 7/1985 | Laramee ............................... 123/557 |
| 4,700,684 | 10/1987 | Pischinger et al. ................. 123/348 |
| 4,827,889 | 5/1989 | Ray ....................................... 123/557 |
| 4,898,142 | 2/1990 | Van Wechem et al. ............ 123/557 |

Primary Examiner—E. Rollins Cross
Assistant Examiner—M. Macy
Attorney, Agent, or Firm—Venable, Baetjer, Howard & Civiletti

[57] ABSTRACT

A system that adjusts the temperature and air fuel ratio of the combustible mixture provided in a combustion engine to control the force or torque output of that engine.

8 Claims, 7 Drawing Sheets

METHOD AND APPARATUS FOR FORCE OR TORQUE CONTROL OF A COMBUSTION ENGINE

DESCRIPTION OF THE INVENTION

1. Field of Invention

This invention relates to apparatus for the control of force or torque output of a combustion engine, and more specifically to a method of control which reduces the amount of work required to draw in the combustible mixture and to expel the combustion products from such an engine.

2. Background of the Invention

In prior art, continuous-flow or sequential batch-flow combustion engines having one or more combustion chambers that use a throttle to control the output force or torque at any fixed engine rotational or translational speed, the throttle, as it is closed, causes a reduction in the pressure through fluid resistance of the combustible mixture being drawn into the combustion chamber or chambers and thereby reduces the number of molecules of combustible material present in the combustion chamber at the time the combustion process occurs. This reduces the amount of heat released when said combustible material is burned, which in turn reduces the output force or torque of the engine.

This reduction of the pressure of the combustible material being drawn into the combustion chamber below the pressure of the combustion products expelled from the combustion chamber increases the mechanical work required to draw the combustible material into the combustion chamber through the intake system of the engine and to expel the combustible mixture from the combustion chamber through the exhaust system. In engine literature this is called "pumping work". Pumping work reduces the useful force or torque output of the engine for a given amount of combustible material, and thereby reduces the engine's thermal efficiency.

How much is the thermal efficiency reduced by the pumping work? Our research has shown that when the engine is operated to provide a fraction of its maximum output torque, there will be an improvement in fuel economy of about 15% with the present invention, which eliminates this loss associated with pumping work. This improvement is diminished as the output torque is increased, until, at maximum output torque, there is no improvement provided by the present invention.

Earlier studies by the inventor and his colleagues have shown that, on average, the engine operates at less than half of the peak output torque about 99% of the time in highway driving, and about 84% of the time in city driving. It is at these torque levels that the present invention provides the greatest improvements in efficiency.

It is well known to those skilled in the art that one alternative means of controlling output force or torque which usually leads to less pumping work than throttling is adjustment of the fraction of fuel in the combustible mixture entering the combustion chamber. In this way the amount of heat released when this combustible material is burned is reduced without decreasing the pressure of the mixture drawn into the combustion chamber and thus the pumping work is not increased. This means is called "lean operation" and is employed in the Diesel engine. In many types of combustion engines in which the fuel and oxidant are mixed at the molecular level before introduction into the combustion chamber or chambers (the so-called "premixed charged" engine), a substantial decrease in the fraction of fuel present in the combustible mixture at the time the combustion event is initiated will result in the onset of unsteady and inefficient engine operation due to poor burning of the combustible mixture. The threshold mixture at which poor burning begins is sometimes called the "flammability limit." Because of the existence of the flammability limit the range of force or torque control attainable with lean operation is insufficient for most applications. In combustion engines where a hydrocarbon is the fuel and air is the oxidant, the fraction of fuel in the combustible mixture can only be reduced to typical about 70% of the chemically balanced, or "stoichiometric", fraction before the flammability limit is reached. This means that at any given engine speed the heat release, and thus the force or torque output, can only be reduced to approximately 70% of the maximum in such engines.

What is needed and what is supplied by the present invention is an engine force or torque control apparatus that reduces pumping work, increases engine efficiency, and thereby provides a greater range of force or torque control than that attainable with lean operation of premixed charge engines.

The method employed in the present invention involves heating the intake combustible mixture. The concept of heating the combustible mixture being supplied to a combustion engine is not new. There are many existing patents on apparatus for changing the temperature of the incoming mixture. For example, Kenneweg U.S. Pat. No. 1,953,809 provides apparatus to cool the incoming mixture to counteract overheating of the carburetor. Wood U.S. Pat. No. 4,029,065 uses heat from the cooling liquid of the engine to heat the incoming mixture to increase vaporization of the liquid fuel in order to enhance uniformity of mixture distribution to the various combustion chambers. Arpaia U.S. Pat. No. 3,053,242 uses exhaust heat of the engine and even catalytic material to perform this vaporization function. Many other patents: Karl U.S. Pat. No. 3,441,011; Ojala U.S. Pat. No. 3,672,342; Linder U.S. Pat. No. 4,044,742; Igashira U.S. Pat. No. 4,362,142 describe apparatus to heat or cool the intake mixture to enhance vaporization of the liquid fuel or to reduce overheating of the carburetor. Almost every vehicle produced in the last 25 years has some form of heating device to enhance vaporization when the engine is cold.

The novelty of the present invention is the concept of control of an engine output by varying the density of the intake combustible mixture by controlling the temperature of that mixture rather than by controlling the pressure by means of a throttle as is done in normal throttle controlled engines.

An unexpected result of the present invention was a marked reduction in the levels of oxides of nitrogen emitted in the exhaust of the engine. Use of the present invention provides an opportunity for reducing fuel consumption as well as providing cleaner exhaust gases, further enhancing the commercial value of the present invention.

SUMMARY OF THE INVENTION

In the present engine control system, output force or torque is controlled primarily by adjustment of the temperature of the combustible mixture. This temperature adjustment changes the number of fuel and air molecules per unit volume of gas, and thus changes the number of fuel and air molecules drawn into the combustion chamber or chambers without significantly changing the pressure of the combustible material. Since the pressure is not reduced when the output force or torque is reduced, pumping work is not increased when output force or torque is reduced. This increases the available force or torque output for a given amount of combustible material over that of prior art engines. Furthermore, since this control system is applicable to premixed-charge engines, the greater force or torque output of premixed-charge engines of the same size is retained.

An important second advantage of the use of temperature adjustment to control output force or torque is that an increase in temperature leads to a decrease in the fraction of fuel at the lean flammability limit. Hence, increasing the temperature of the combustible mixture leads to an increase of the range of force or torque control attainable through lean operation, opening the possibility of mutually beneficial use of temperature adjustment and lean operation to control force or torque.

DETAILED DESCRIPTION OF THE INVENTION

Figure 1:
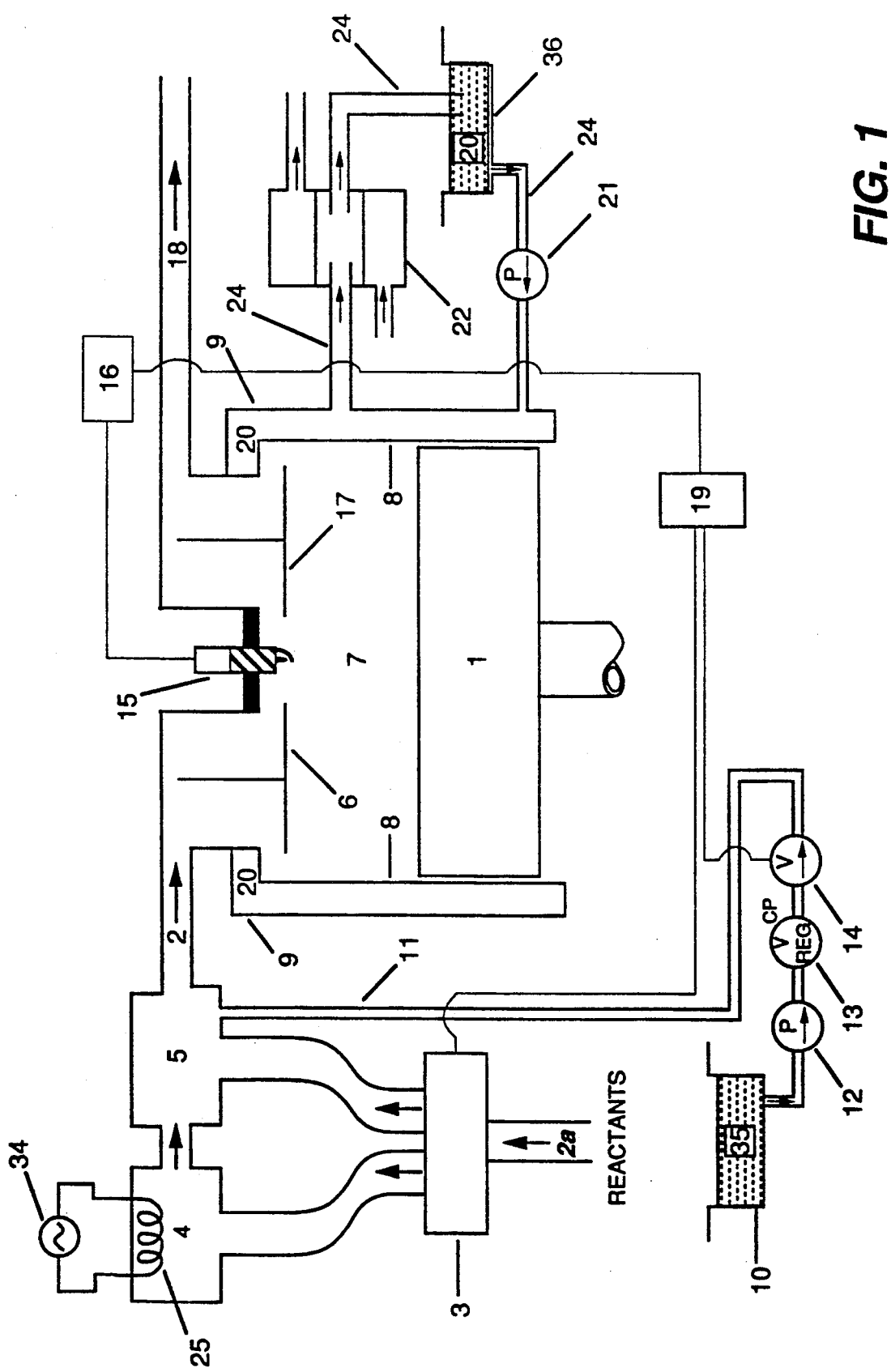
FIG. 1 is a schematic diagram showing one preferred embodiment of the invention in which an electrical heater is used to provide heat energy to the source that is used for heating the air-fuel mixture that is supplied to a combustion engine in order to control its output power.

The elements of one general embodiment of the invention are shown in FIG. 1. One or more reactants which may include fuels and/or oxidants are drawn by suction caused by displacement of one or more pistons (1) through an inlet (2a) past a diverter valve (3) where a portion of the reactants are diverted to a heat source (4) where said reactants are heated and then returned into a mixing plenum (5) and delivered to the combustion chamber through an intake manifold (2), thus providing means for the control of the rate of heat transfer from said heat source to the combustible mixture which is formed in the mixing plenum (5) where the reactants are mixed forming a combustible mixture. The mixture is drawn past one or more intake valves (6) into one or more combustion chambers (7) defined by a piston (1), cylinder (8) and cylinder head (9).

In this embodiment of the invention there is a path for fuel (35) defined by a fuel reservoir (10), fuel line (11), fuel pump (12), fuel pressure regulator (13) and fuel flow regulation system (14) comprising valve means to control the flow of a fuel to said combustible mixture providing means for control of the composition of said combustible mixture in said mixing plenum (5) by altering the proportion of fuel added to the other reactants in said mixing plenum (5). After the combustible mixture from the mixing plenum (5) is drawn, by suction caused by displacement of one or more pistons (1), into the combustion chamber or chambers (7), the intake valve (6) is closed and the piston (1) compresses the combustible mixture whereupon it is ignited by an ignition device (spark plug) (15) whose energy is provided by an ignition energy generator (16).

The combustible mixture is burned in the combustion chamber (7) causing an increase in the pressure in the combustion chamber (7) leading to an output force or torque when the burning mixture is allowed to expand via motion of the piston (1). Upon completion of the expansion process, one or more exhaust valves (17) are opened and the burned gases escape from the combustion chamber (7) out through an exhaust pipe (18) due in part to the pressure of the exhaust gases relative to the surroundings and in part to the displacement of the piston (1). The diverter valve (3), fuel flow regulator (14) and ignition energy generator (16) are controlled by a computer (19). The temperature of the cylinder wall (8) is controlled by the flow of a coolant fluid (20) from a coolant reservoir (36) through a coolant pipe (24) to a pump (21) through a chamber in the cylinder wall (8) and the cylinder head (9), which define a portion of the combustion chamber and finally through a heat exchanger (22) after which the coolant may be recycled through the coolant pipe (24).

In the embodiment of the invention shown in FIG. 1, the heat energy is supplied to the heat source by an electrical heater element (25) whose energy is supplied by an electrical energy source (34).

Figure 2A:
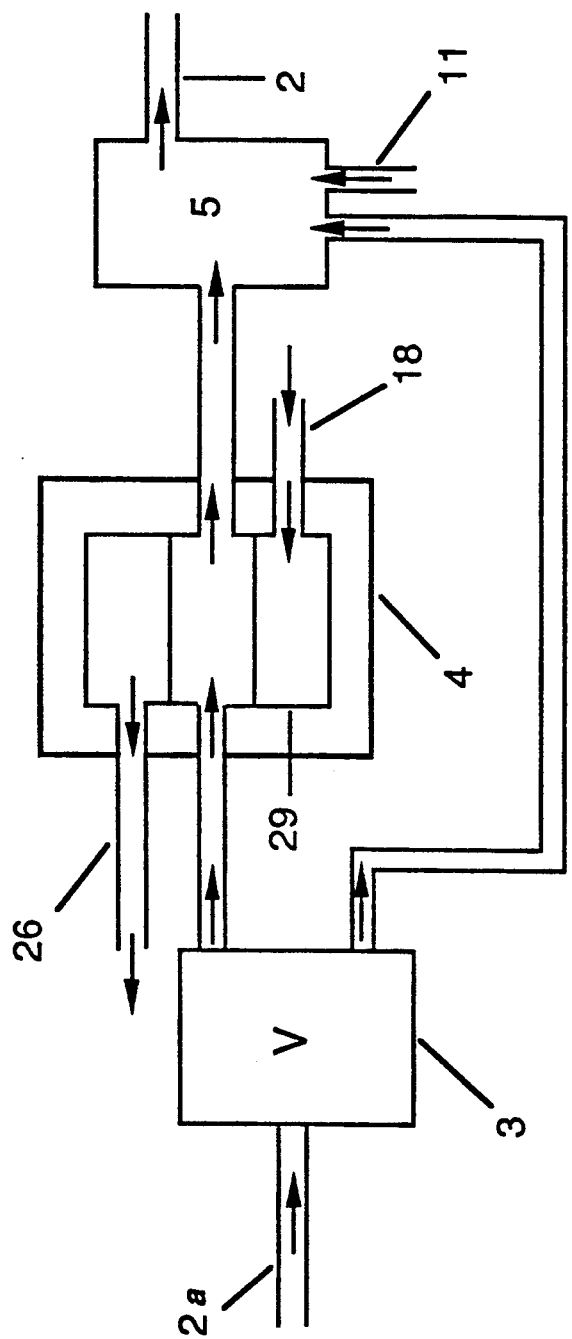
FIG. 2a shows the use of exhaust gases to provide said heat energy to the heat source in place of the electrical heater of FIG. 1.

In another embodiment of the invention, a fragment of which is shown in FIG. 2a, the exhaust gases from said combustion engine in exhaust pipe (18) are routed through the heat source (4) through a heat exchanger (29) the source of heat energy is thus the heat in the exhaust gases from said combustion engine. After surrendering a portion of the exhaust heat to the heat source (4) the exhaust gases are exhausted through an additional exhaust pipe (26). By this means heat energy may be transferred from the exhaust gases to the portion of the combustible mixture which is diverted through to the heat source (4).

Figure 2B:
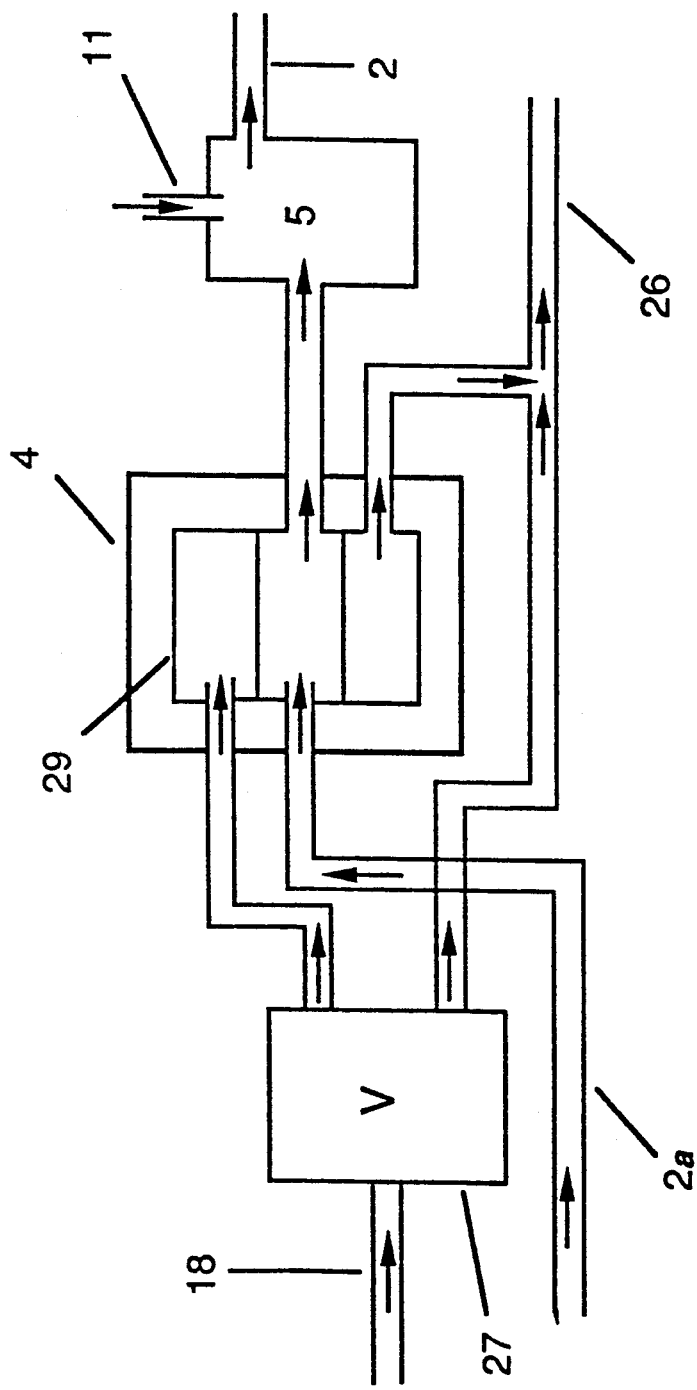
FIG. 2b includes a diverter valve to vary the portion of the exhaust gas that is directed to the heat source.

In the embodiment shown in FIG. 2b, the diverter valve (3) of FIG. 1 may be omitted, and an alternate diverter valve (27) is placed in the exhaust pipe (18) to divert a portion of the exhaust gases to the heat source to control the heat energy supplied to said heat source (4) to provide means to control the rate of heat transfer from said heat source to said combustible mixture. After leaving the heat source (4) the exhaust gases flow through an additional exhaust pipe (26).

Figure 3:
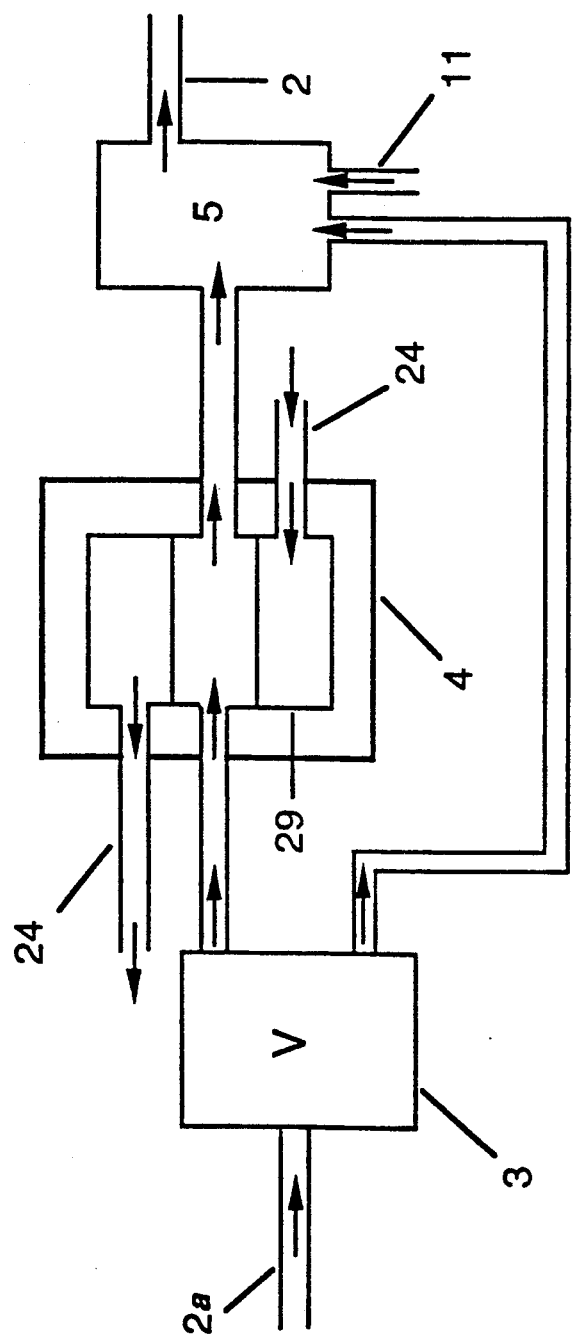
FIG. 3 illustrates the use of a cooling fluid of the combustion engine as a source of heat energy.

Alternatively, as is illustrated in FIG. 3, a coolant fluid (20) surrenders a portion of the coolant heat to the heat exchanger (29) located in the heat source (4) where the heat is transferred to the combustible mixture. In this embodiment the diverter valve (3) diverts a portion of the reactants to the heat exchanger (29) where the combustible mixture is heated.

Figure 4:
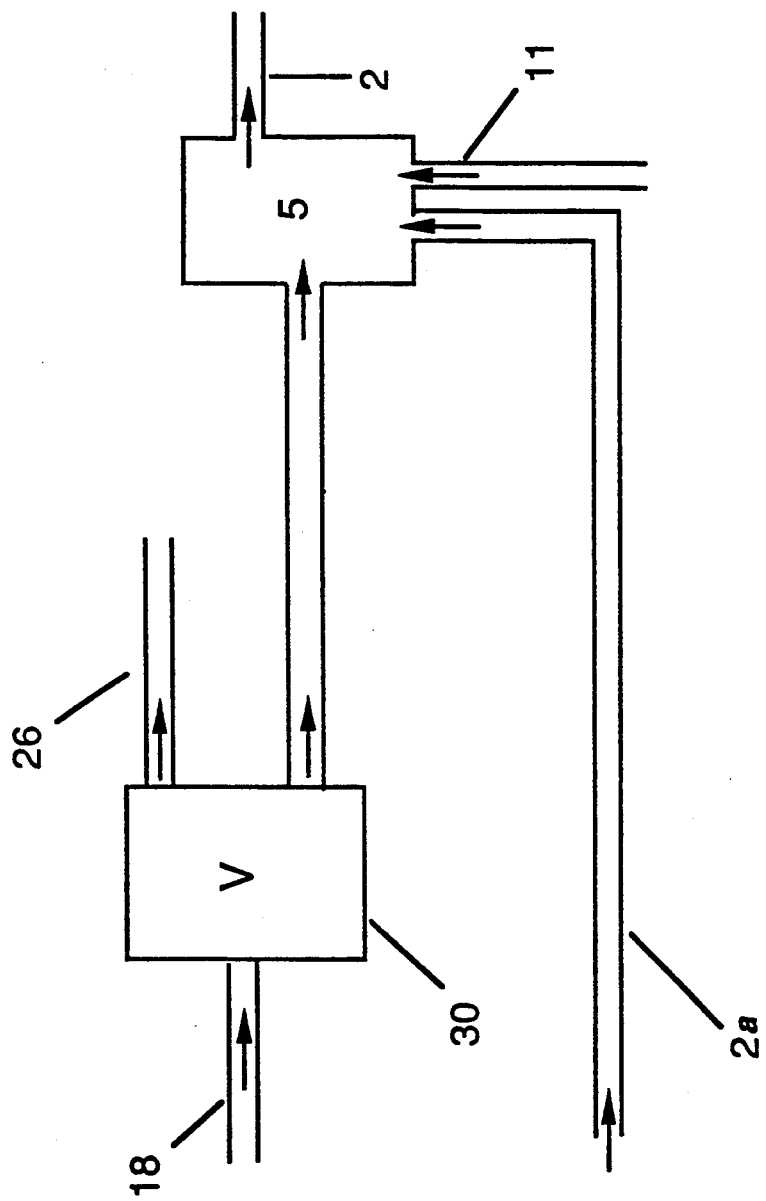
FIG. 4 illustrates control of the output torque by direct heating of the combustible mixture by diverting a portion of the exhaust gas into the fuel air mixing plenum.

Another embodiment of the invention is shown FIG. 4, in which a diverter valve (30) is placed in the exhaust pipe (18) to divert a portion of the exhaust gases of the combustion engine to the mixing plenum (5) to provide means for control of the temperature of combustible mixture for the combustion engine in order to provide force or torque control of said engine, by control of the quantity of material added to said combustible mixture. In FIG. 4 said material added to said combustible mixture to control its temperature comprises exhaust gases from said combustion engine.

Figure 5:
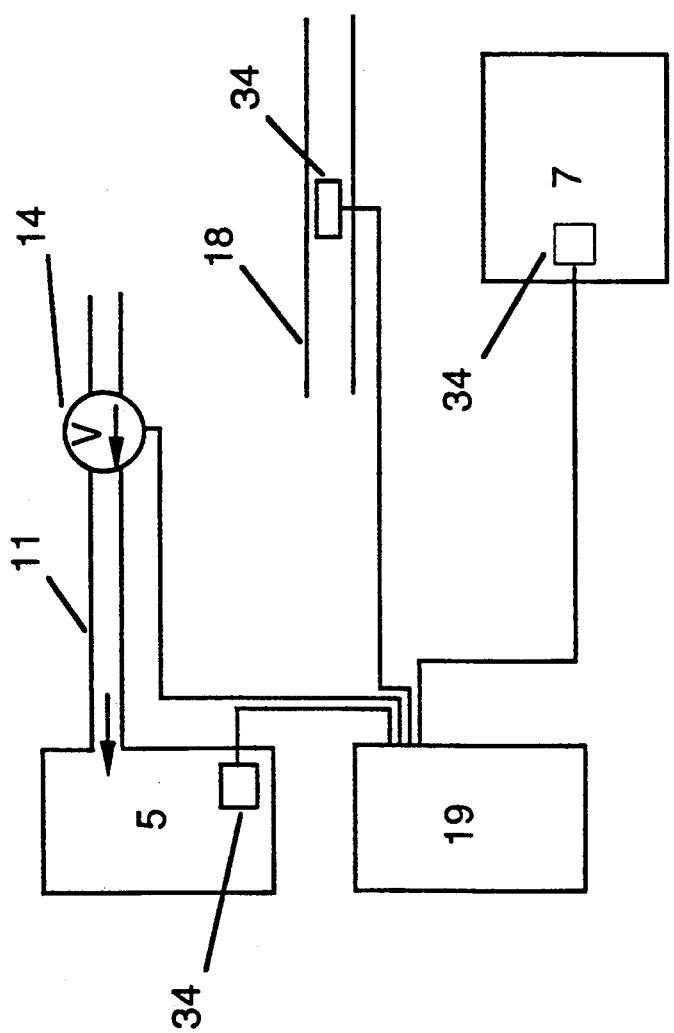
FIG. 5 illustrates the use of sensor means to sense the ratio of air to fuel in the combustible mixture to provide a means for control of the ratio of air to fuel in the combustible mixture.

FIG. 5 shows an embodiment of the invention which incorporates sensor means (34) for sensing the ratio of air to fuel of the combustible mixture in the mixing plenum (5), to permit control of said air to fuel ratio or composition. Sensor means provides a signal to the computer (19), which provides a signal to the fuel flow regulator (14) to regulate the flow of the fuel into the mixing chamber (5). Said sensor means can sense one or more of the following indicators of the composition of said combustible mixture:

1. The flammability of the combustible mixture in the mixing plenum (5).
2. The oxygen in the exhaust gases in the exhaust pipe (18) when one of the reactants in the combustible mixture is air or oxygen.
3. The unburned fuel in the exhaust gases in the exhaust pipe (18).
4. The speed of a flame propagating in the combustible mixture in the combustion chamber (7).
5. The combustion temperature of the burning mixture in the combustion chamber (7).
6. The output torque or force of the combustion engine.
7. The speed of rotation or translation of the engine.

The sensor means for each of the indicators of the composition of the combustible mixture listed above are well known to those skilled in the art of sensing. These are:

1. A catalyst such as a simple heated platinum wire where the energy required to hold the catalyst temperature constant is an indicator of the flammability of the combustible mixture.
2. An oxygen sensor commonly used on combustion engines to control the ratio of air to fuel of the combustible mixture for said combustion engine.
3. A catalyst such as a simple heated platinum wire where the energy required to hold the catalyst temperature constant is an indicator of the presence of unburned fuel in the exhaust gas.
4. An ion probe in the combustion chamber to sense the time of arrival of the flame front at the ion probe.
5. A thermocouple probe in the combustion chamber to sense combustion temperature.
6. A strain gauge beam to measure angular deviation from the engine position at rest.
7. A tachometer to measure engine drive shaft rotational speed.

The seven indicators of the composition of the combustible mixture are commonly used sensors and are useful for the purposes of this invention.

We have found experimentally that there are three preferred embodiments, which employ sensors which are widely used in current engines and which produce satisfactory results in the present invention.

Figure 6:
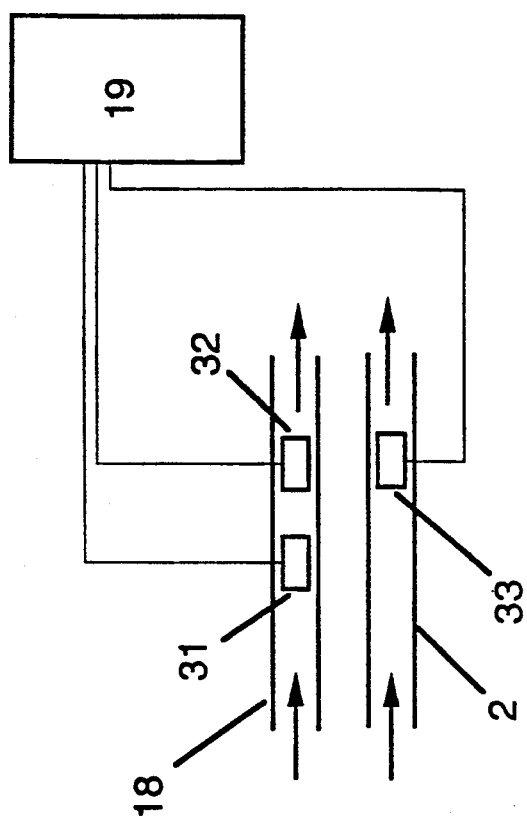
FIG. 6 illustrates the three sensors used in the invention.

In FIG. 6 these three sensors are shown. They are, (31), an oxygen sensor in the exhaust pipe (18) as used in most modern cars, (32), a thermocouple temperature sensor in the exhaust pipe (18) and (33), a heated platinum wire in the intake manifold (2) that acts as a catalyst to cause fuel and oxidizer to burn on its surface, at temperatures which are lower than the normal ignition temperature of the combustible mixture.

What is claimed as new is:

1. An apparatus for controlling the output torque of an internal combustion engine comprising:
   an internal combustion engine having at least one combustion chamber;
   an intake manifold attached to said engine and in communication with said combustion chamber;
   a mixing chamber connected to and in communication with said intake manifold;
   a heat exchanger coupled to and in communication with said mixing chamber which allows for unrestricted flow of fresh air to said intake manifold such that the total volume of air delivered to the combustion chamber is generally constant;
   a heat source that provides heat to said heat exchanger;
   means for controlling the rate of heat exchange between said heat source and the fresh air flowing therethrough thereby manipulating the density of the air delivered to said combustion chamber and thus controlling the output torque of the engine making unnecessary the use of a throttle restriction to control the quantity of combustible mixture supplied to said engine; and
   means for delivering fuel to said mixing chamber.

2. An apparatus for controlling the output torque of an internal combustion engine as set forth in claim 1, further comprising:
   means for monitoring the exhaust of said engine; and
   means for controlling the fuel delivery in response to said exhaust monitoring means.

3. An apparatus for controlling the output torque of an internal combustion engine as set forth in claim 1, wherein said heat source includes heat from the exhaust gases from said engine.

4. An apparatus for controlling the output torque of an internal combustion engine as set forth in claim 1, wherein said engine includes a circulating fluid cooling system and said heat source includes heat from said circulating fluid cooling system.

5. An apparatus for controlling the output torque of an internal combustion engine as set forth in claim 1, wherein said heat source comprises an electric heating element.

6. An apparatus for controlling the output torque of an internal combustion engine as set forth in claim 1, wherein said means for controlling the rate of heat exchange comprises:
   a diverter valve having an inlet and at least two outlets, the first outlet coupled to said heat exchanger and the second outlet coupled to said mixing chamber such that air entering said inlet is adjustably distributed into said heat exchanger and said mixing chamber.

7. An apparatus for controlling the output torque of an internal combustion engine as set forth in claim 1, wherein said heat source includes hot exhaust gases from said engine and said means for controlling the rate of heat exchange includes a diverter valve which variably controls the amount of hot exhaust gases from said engine supplied to said heat exchanger for variably heating the air entering said intake manifold thus controlling the density of air entering the combustion engine.

8. A method for controlling the output of an internal combustion engine comprising:
  introducing an unrestricted and generally constant volume of fresh air into an intake manifold of an engine having at least one combustion chamber;
  adjustably heating at least a portion of the fresh air prior to entering the combustion chamber thereby manipulating the density of the air delivered to the combustion chamber and thus controlling the output torque of the engine making unnecessary the use of a throttle restriction to control the quantity of combustible mixture supplied to the engine; and
  controllably feeding fuel into the intake manifold of the engine such that the fuel mixes with the fresh air.

* * * * *